United States Patent [19]

Green

[11] 4,001,968

[45] Jan. 11, 1977

[54] SOIL IRRIGATION SYSTEM AND METHOD

[76] Inventor: Evert S. Green, 14 Kenneth Ave., N. Bellmore, N.Y. 11710

[22] Filed: July 30, 1975

[21] Appl. No.: 600,351

[52] U.S. Cl. .................................. 47/80; 428/131; 428/454; 47/9
[51] Int. Cl.² ........................................ A01G 27/00
[58] Field of Search ............... 47/38.1, 38, 39, 18, 47/31; 428/131, 454

[56] References Cited

UNITED STATES PATENTS

| | | | |
|---|---|---|---|
| 1,222,648 | 4/1917 | Marks | 47/18 |
| 2,346,029 | 4/1944 | Jennings | 47/38.1 |
| 2,639,549 | 5/1953 | Wubben et al. | 47/38 X |
| 2,916,854 | 12/1959 | Heigl et al. | 47/58 |
| 3,193,970 | 7/1965 | Green | 47/38.1 |
| 3,220,144 | 11/1965 | Green | 47/38.1 |
| 3,778,928 | 12/1973 | Green | 47/38.1 |
| 3,863,388 | 2/1975 | Loads | 47/56 |
| 3,890,739 | 6/1975 | Blackburn | 47/56 |

FOREIGN PATENTS OR APPLICATIONS

| | | | |
|---|---|---|---|
| 1,414,605 | 9/1965 | France | 47/38.1 |
| 720,949 | 12/1954 | United Kingdom | 47/38.1 |
| 1,035,136 | 7/1966 | United Kingdom | 47/38 |
| 1,262,035 | 2/1972 | United Kingdom | 47/38.1 |

Primary Examiner—Robert E. Bagwill
Attorney, Agent, or Firm—Kenyon & Kenyon Reilly Carr & Chapin

[57] ABSTRACT

Irrigation of a body of soil or other plant-growing medium appropriate for growing plants in hothouses, florist shops and the like is controlled by interposing between the body of soil, which may be in a container having a water-permeable bottom, and a body of water-receptive material to which water is supplied, preferably at a controlled rate, a capillary sheet of impermeable and preferably opaque plastic having a multiplicity of regularly spaced capillary openings therein through which water migrates in travelling from the water-receptive material into the body of soil. The water-receptive material may comprise and preferably consists of a silica sand catalytic plastic sheet having on one side thereof a coating of silica sand particles interspersed by a network of capillary spaces that are conducive to lateral spread of water supplied thereto, said silica sand catalytic sheet also being beneficial in installations wherein a body of soil is in direct contact therewith. Since silica sand possesses both attraction and repulsion of water, the silica sand catalyst is referred to as "absorbent-repelling material."

22 Claims, 6 Drawing Figures

SOIL IRRIGATION SYSTEM AND METHOD

FIELD OF THE INVENTION

This invention relates to the irrigation of soil or other growing medium for plants and relates more especially to the irrigation of bodies of soil in standard plant containers therefor appropriate for plant culture in hothouses, florist shops and the like.

BACKGROUND OF THE INVENTION

The proper irrigation of soil or other plant-growing medium is important in achieving optimal conditions for successful plant culture. In my U.S. Pat. Nos. 3,220,144 and 3,193,970 apparatus is disclosed for providing control and regulation of water appropriate in the case of a single plant. In my U.S. Pat. No. 3,778,928 an irrigation system is disclosed appropriate for the controlled irrigation of a plurality of plants in individual containers disposed on a common support such as a bench used in a hothouse. The invention of the present application, while having application to the irrigation of single plants, has special application in providing improved means, as compared with the system disclosed in my U.S. Pat. No. 3,778,928, for the controlled irrigation of a plurality of plants.

It is an object of this invention to provide improved control of capillary travel of water from a water-receptive material to which water is supplied to a body of soil or other plant-growing medium.

It is also an object of this invention to provide improved means and method for the lateral capillary movement of water in becoming distributed to plants in a plant-growing medium or in a water-receptive material from which water migrates to a body of soil or other plant-growing medium in a container.

Further objects of this invention reside in providing improved apparatus and method for minimizing the growth of algae or the occurrence of any other anaerobic condition.

Further objects of this invention relate to improved apparatus and method conducive to supply of nutrients in a form readily assimilable by plants.

Still further objects of this invention relate to improved apparatus and method for controlling the irrigation of soil or other plant-growing medium whereby plant growth is stimulated not only by the supply of plant nutrients but by the removal of plant waste products.

GENERAL STATEMENT OF INVENTION

In the following specification and in the claims the term "soil" has been used for the sake of brevity not only in connection with ordinary garden soil but also other solid plant-growing media such as humus, peat moss, vermiculite, etc., whether used alone or in various mixtures for enriching or modifying garden soil so long as the material is porous and water-absorptive and is not injurious to plant growth. According to one of the features of this invention, there is interposed between a water-receptive material to which water is supplied and an overlying body of soil, which normally is in a container having a permeable bottom, a plastic sheet that is impervious to moisture and that preferably is opaque, which sheet has a multiplicity of spaced openings which are adapted for capillary flow therethrough of water contained in the water-receptive material to the overlying body of soil, including transmission through the drains in the bottom of a container for the soil, such as the drain openings that are conventionally provided to supply drainage. When there is a growing plant that is rooted in the soil in the container, the network of roots by osmosis absorbs moisture from the soil which travels to the exposed portion of the plant where much of it is discharged into the atmosphere. A growing plant is a living thing which performs this function so as to exercise a very considerable absorptive force inducing the flow of so-called capillary water through the soil and into the root system of the plant. I have found that in the practice of this invention the capillary flow induced by the root system of the plant is sufficient to exert a pull through the openings in the capillary sheet with the result that the induced capillary flow extends upward through the openings in the capillary sheet and into the drain in the bottom of the plant container for absorption by the plant. At the same time the capillary sheet serves to prevent substantial loss of moisture from the portions of the sheet which are not covered by a plant container. Moreover, when the sheet is black or otherwise is opaque the underlying water-receptive material is protected so as to minimize growth of algae.

If water is continually supplied to the water-receptive material in amounts slightly in excess of that which is drawn up through the capillary openings in the sheet into the soil some of the water is drained away and this is essential in order to promote the catalytic action and promotion of free oxygen content of the water desired for favorable plant growth. At the same time that water is being absorbed into the root system of the plant the living organism of the plant in some way that is not altogether understood manages the excretion of a certain amount of unwanted material and it is believed that in the capillary migration from the water-receptive material through the openings in the capillary sheet and also in the hydraulic pool of water that overlies the capillary sheet adjacent or under the plant containers a certain amount of exchange is accomplished such that unwanted excretions reach the water in the water-receptive material with the result that when there is some drainage from the water-receptive material the unwanted excretions are removed and the system as a whole is kept in an aerobic condition. If the water becomes stagnant an anaerobic condition tends to build up and such buildup is minimized in the practice of this invention. The drain of excess water may be accomplished by drainage through drain openings at various locations in a support for the silica sand catalytic sheet or, if the support is not provided with drain openings, a drain may be employed in the manner that I have disclosed in my U.S. Pat. No. 3,778,928.

Polyethylene sheet material such as that which is conventionally available in the form of continuous sheets is preferred for the capillary sheet. The thickness of the sheet material is not critical. Thus, good results are obtained using sheets the thickness of which is of the order of 1 ½ mills, or 4 mills or 6 mills. When the sheet is 1 ½ mills in thickness the cost is so low the sheet may be discarded after use. The sheet material that is used to prevent growth of algae is opaque and in the usual case is black. The capillary openings may be produced by passing the plastic sheet from an unwind roll to a wind-up roll between which there is a pair of rolls that the sheet passes between, one of the rolls presenting a multiplicity of projecting prongs and the other roll presenting a yieldable surface such that the prongs may pass through the sheet material and may be withdrawn again during travel of the sheet through the nip between the rolls. Capillary openings having desirable functional utility for capillary flow may be produced by using prongs the diameters of which are about 0.045 inch. The functional utility of 0.045 inch capillary size openings is prevention of root escape from the soil porton in the container. The spacings between openings in the capillary sheet for all practical purposes are regularly spaced approximately ½ inch apart. During the process of making the capillary holes prongs will rip larger holes than 0.045 inch but resealing under use will reduce their size to approximately 0.045 inch. By adjusting the rolls that produce the holes the extent to which ripping occurs to somewhat enlarge the holes may be varied. Some ripping of the plastic sheet occurs in any event. By way of illustration, if a hole is about 0.045 inch in diameter there usually is a small flap that reduces the free opening to about 0.03 inch. However, in use the action of the plant in drawing water through the opening will open the flap somewhat after the manner of a flap valve. When the hole is produced so as to be about 0.145 inch in diameter with the occurrence of a larger flap, the flap may tend to close the opening to about 0.045 inch of free opening but becomes moved to enlarge the opening when in use due to the drawing of water therethrough by the plants. Especially in the case of larger plants, the larger holes are desirable so as to provide an adequate supply of water, e.g., in hot weather. The spacing of the holes from each other desirably is about ½ inch when the plastic sheet is 1.5 mills in thickness especially when larger holes are made therein since if the spacing were reduced to ⅛ inch, for example, and the holes were made to be about 0.145 inch in diameter, there would be danger of shredding the plastic sheet. However, in the case of sheets of greater thickness such as 4 or 6 mills the holes can be more closely spaced, e.g., so as to run about ⅛ or ¼ inch from each other on the average or somewhat greater than ½ inch for use with large plants. While the capillary sheet ordinarily is produced by punching holes in a continuous plastic sheet, it is possible to crisscross ribbons of plastic so that openings of about the diameter and spacing hereinabove described will be provided.

The capillary sheet may be used in various settings. Thus, it may be placed over a body of soil or over a body of water-absorptive permeable foam material or other water-receptive material, namely, a material having interstices or pores adapted to receive water so that the material becomes wet or moist because of the water received in and among the pores and interstices. Preferably, however, the capillary sheet is used in combination with water-receptive material in the form of a silica sand catalytic plastic sheet which has adherent to one surface thereof a coating of sand particles interspersed with a network of capillary spaces which is conducive to the lateral flow of water from a point of local application so as to spread into areas for even distribution. If the sand layer is excessively thick it tends to hold the water in a form that may be likened to an absorbent gel, which is undesirable as tending to the creation of anaerobic conditions. By the employment of silica sand particles which preferably have become somewhat rounded as the result of being windblown and which are small so that most of them are less than 0.25 mm in diameter and which preferably are of graded size ranging from about 0.002 through 0.05 mm and 0.1 mm with a maximum of approximately 0.25 mm, and by applying the sand so as to provide a substantially continuous coating approximately one grain of sand in thickness a sheet is provided which contains a network of capillary passages which I have found to exercise an extraordinarily great effect in inducing lateral capillary spread of water applied in a localized portion of the sheet. This is important because it assists greatly in maintaining aerobic conditions which again depend on adequate drainage for the catalytic action. Because silica sand is an amphoteric substance, it has both acidic and basic properties. It is evident that during capillary travel a catalytic effect is produced on plant nutrients as by ionization which makes them more readily absorbed into the living plant for contributing to its growth. As aforesaid, there is migration in the capillary passages both to and from the zone of the plant roots with the result that some of the nutrients contained in the soil become influenced by the silica sand catalyst sheet during the respiration process of the plant in a manner that is favorable to healthy plant growth. I have found that by the employment of the silica sand catalyst sheet the vigor of plant growth appears to be markedly improved. This is the case even though the silica sand catalyst sheet is used merely to overlie the bottom of a hothouse bench or the like which is filled with soil in which plants are being grown.

In the preferred practice of this invention the silica sand catalyst sheet is employed directly underneath the capillary sheet in conjunction with means for supplying water at one or more localized zones in the interface between the two sheets. When this combination is being employed the supplied water readily spreads laterally by the capillary action of the network of capillary spaces in the silica sand catalyst sheet and is available for capillary migration through the capillary openings in the capillary sheet for transmission to soil in a container having drain holes in the bottom resting on the capillary sheet. In this manner the capillary sheet by preventing evaporation provides a substantially uniform distribution of water at the interface between the two sheets and by using opaque sheet material for the capillary sheet protection is afforded against harmful algae. When water is supplied so as to be slightly in excess of that which is drawn up into the plants with a certain amount of drainage of the excess moisture, the water supply is kept fresh and the excrement from the plant is taken away, with the resultant creation of a combination of conditions which I have found to be extremely favorable to plant growth, including the beneficial effects of the silica sand catalyst sheet. The silica sand catalyst sheet may be prepared from any plastic sheet material. The silica sand catalyst sheet material preferably utilizes a vinyl base sheet. By applying a conventional solvent to the surface of the vinyl sheet it can be rendered sufficiently sticky before the solvent evaporates to cause the silica sand to adhere thereto as a thin layer. Alternatively, a polyethylene sheet may be used and by applying a conventional water-resistant adhesive that is sticky prior to drying, the sand particles can be caused to stick thereto. As aforesaid, the silica sand is applied as a thin coating with the sand particles sufficiently closely spaced to provide a network of capillary spaces conducive to lateral spread of water therealong. The coating should not be built up so as to be of multiple grain thickness, both for efficiency, and reduction of weight which is a cost factor in shipment.

In the practice of this invention a substantially horizontal support is normally employed since the flow of the irrigation water is best controlled under these conditions. For example, the silica sand catalyst sheet may be spread over the top of a bench corresponding in size to that which is commonly used in hothouses, i.e., about 4 6 ft. in width. The capillary sheet is then spread directly over the silica sand catalyst sheet. These sheets may be produced from any standard size roll of 1,000 or 4,000 linear ft. and when the width does not conform to the dimensions of the bench the sheets may be cut down to size or, if too small to cover the entire support, several may be slightly overlapped to provide continuity.

For supplying water a supply system may be employed such as that described in my U.S. Pat. No. 3,778,928 wherein water is supplied from a reservoir in which water supplied from an outside source is maintained at a constant level by a float valve, by the wicking action of a porous material through which the water is transferred to the water-absorbent material on the bench. However, it has been preferable, as will be described more in detail hereinbelow, to provide for the supply of water by the use of float valve, manifold and leader tubes. The leader tubes terminate at any one or more locations in the water-receptive material disposed on the surface of the bench. I have found that by using this system with leader tubes, large size 0.075 inch I.D. and small size 0.045 inch I.D., I can apply water from the 1 inch I.D. manifold tube to one bench or to each pallet for the purpose of providing a continuous supply of water that is somewhat in excess of that required for plant growth. The float valve maintains a water level just high enough to keep the manifold full of water, creating a water pressure on the leader tubes of a fraction of one lb. per inch.

For large installations, the supporting means may comprise a plurality of supporting pallets each of which has spread over the upper surface thereof the silica sand catalyst sheet in combination with the capillary sheet overlying the silica sand coating, a plurality of pallets being in contiguous relation with the silica sand catalyst sheet and the capillary sheet slightly overlapping. The employment of pallets is especially desirable in large installations which are such that a travelling crane or the like may be used to lift individual pallets for removal of the proper stage in plant growth. Especially in the case of pallets, it is preferable to provide a border about ¼ inch in height around the periphery for reasons of slowing down too fast drain-off over a flat surface.

Further purposes, features and advantages as well as further more detailed descriptions are set forth hereinafter in connection with the accompanying drawings, which are intended to be illustrative of the practice of this invention without, however, limiting the scope of this invention, wherein.

Figure 1:
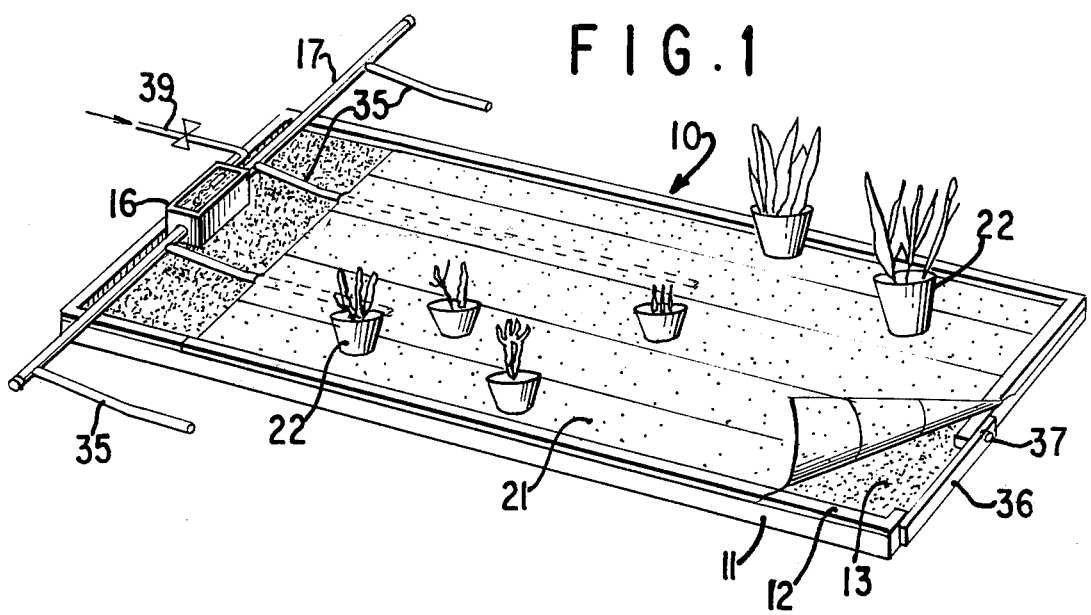
FIG. 1 is a perspective view of the apparatus of this invention in its preferred form wherein the silica sand catalyst sheet is spread over the surface of a pallet support with the overlying capillary sheet in direct contact with the silica sand coating and which comprises a float valve box, manifold and leader tubes.
Figure 2:
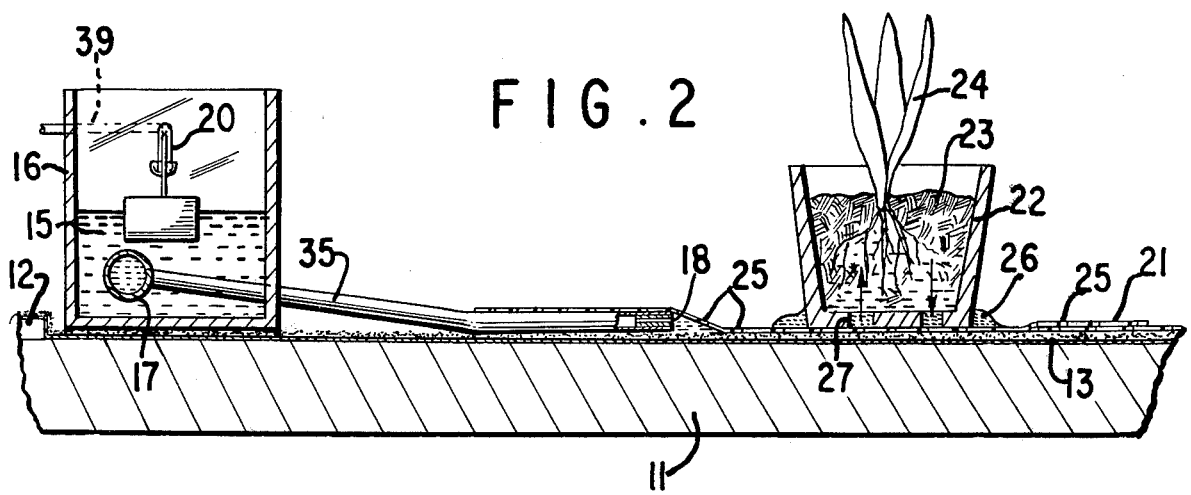
FIG. 2 is a schematic side elevation of a portion of the apparatus shown in FIG. 1 with a soil container placed on the upper surface of the capillary sheet.
Figure 3:
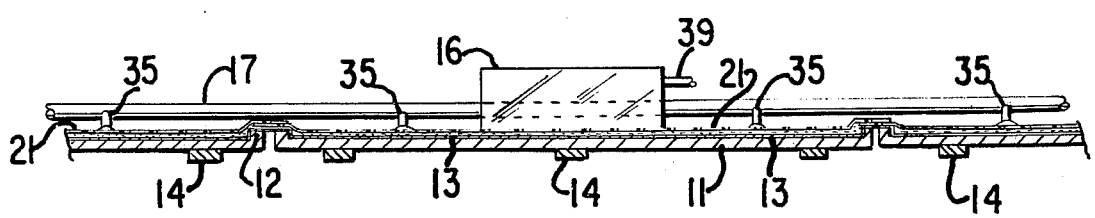
FIG. 3 is a schematic side elevation illustrating the employment of a plurality of contiguous pallets of the kind shown in FIG. 1, including a float valve box, manifold and one or more leader tubes for each pallet installed.

With particular reference to FIGS. 1 and 2, a pallet support is indicated generally by the reference character 10. By way of example, the pallet support may be in the form of a sheet of ¾ inch all weather plywood 11 about ¾ inch in thickness which, if desired, may be provided with stiffening strips underneath. Preferably the upper surface is bordered by a wood strip 12 which is ¼ inch in thickness and about 1 inch in width. However, if increased drainage is desired under certain conditions the strip 12 may be reduced in thickness along one margin of the support 10 or may be removable in its entirety. Preferably a portion of strip 12 along one margin is pivotally mounted to provide a swing gate 36 that can be swung normal to the plane of the surface of the support 10 about the pivot pin 37. By regulating the extent to which the swing gate is opened the damming effect provided by the strip 12 may be controlled in the manner that is regarded as best suited for plant crops' needs at the time. The silica sand catalyst sheet 13 is spread over the surface of the pallet with the silica sand coating uppermost. The capillary sheet 21 is spread over the surface of the silica sand coating of the silica sand catalyst sheet. The pallet may be of any convenient size. That which is representative of typical practice is to employe a pallet about 6 ft. long and 4 ft. wide for utilizing the same pallets on both 6 ft. wide and 4 ft. wide benches. It is not essential that the support for the overlying sheets be in the form of a pallet. Thus, the silica sand catalyst sheet 13 and the overlying capillary sheet 21 may be spread on a bench of the type which commonly is used in hothouses. The employment of a pallet is, however, advantageous in that for large installations a plurality of pallets may be employed in abutting relation with each other, as illustrated in FIG. 3, which shows the pallet support 11 being maintained in position by underlying frame members 14. When a plurality of pallets is employed, both the silica sand catalyst sheet and the capillary sheet may be extended slightly from the abutting margins respectively of the pellets so that the sheets overlying one pallet overlap with the corresponding sheets on an adjoining pallet, thereby providing a continuity of capillary flow from one pallet to an adjoining pallet. A slight overlap such as that mentioned does not interfere with the selective removal of one pallet when the crop that is being grown on that particular pallet is ready to be taken elsewhere for sale or shipment.

For supplying water to the interface between the silica sand catalyst sheet and the capillary sheet any suitable water supply means may be employed which preferably is adapted to supply water continuously at a rate which provides adequate capillary migration to plants being grown in soil which receives water through the capillary openings in the plastic sheet with some excess which drains away from the margin of the support so as to keep the water at the interface between the two sheets fresh and so as to remove excretions from growing plants. In order to conserve water, the supply of water is adjusted so that the amount of drainage is relatively slight.

In FIGS. 1 and 2 a preferred water supply means is shown wherein a body of water 15 in a reservoir 16 is removed therefrom through a 1 inch I.D. manifold tube 17 which runs the length of the greenhouse bench, with leader tubes 35 installed as required, usually one to each pallet. The length of leader tubes usually is about 12 inches and they are unweighted. Since the leader tubes are placed between the capillary sheet and the silica sand catalyst sheet, they will remain in place for the duration. Control of gravity flow from the 1 inch manifold can be accomplished through reduction in flow capacity by using as each of the leader tubes a tube that is 0.045 inch I.D. × 0.077 inch O.D. or that is 0.075 inch I.D. × 0.133 inch O.D.; and since the tolerance is not close the tube 0.045 inch I.D. × 0.077 inch O.D. will fit inside of the tube 0.075 inch I.D. × 0.133 inch O.D. as indicated at 18. Controlled reduction in flow also can be afforded by varying the length of the leader tubes and friction of water. The leader tubes normally are installed longer than needed and cut according to irrigation requirements. Control also is effected by the water level maintained in the reservoir 16 by the float valve. Other expedients can also be employed to control flow of water according to irrigation requirements, e.g., when the leader tubes are made of a stretchable material the internal diameter may be reduced by stretching the tube. The level of the water in the reservoir 16 as provided from a water supply system such as a municipal system or other outside source 39 preferably is controlled by the float valve 20 so as to maintain a predetermined level such as 1 inch above the manifold. Desirably reservoir 16 is of relatively small size so as to minimize as much as possible the length of time during which water remains stagnant in the reservoir. For large installations several reservoirs (float boxes) my be attached to a common manifold.

In FIG. 2, which is on a somewhat larger scale, the container 22 for a body soil 23 is shown overlying the capillary sheet 21, which in turn overlies the silica sand catalyst sheet 13 which rests on the pallet 11. A plant 24 is rooted in the soil 23 and as a result of the osmotic absorption from the soil into the root system the moisture content of the soil is depleted with the result that capillary forces are set up within the soil that are transmitted through the drain opening in the bottom of the container 22 and through the capillary openings 25 in the capillary sheet 21 so as to cause an upward migration of moisture into the soil as indicated by the upwardly directed arrow. At the same time excretions from the plant have been found to migrate through the drain hole in the bottom of the container and through the capillary openings in the capillary sheet as indicated by the downwardly directed arrow in FIG. 2, the excretions becoming mixed with excess water that drains from the interface between the two sheets. This combined action exerted by the root system of the plant is of considerable magnitude especially in the case of the larger plants with the result that a hydraulic pool 26 of water tends to build up around the peripheral margin around the bottom of the container 22. Moreover, this buildup of water tends to occupy the openings 27 in the bottom of the container so that these openings provide an avenue of travel for water taken up by the roots of the plant as well as excretions from the plant. The hydraulic pool is believed to serve as an exchange station for absorption and excretion. The occurrence of the hydraulic pool is assisted by the use of the border about ¼ inch high along the margins of the pallet which is designed to retard the rate of drain-off of the pallet. In the case of a container such as the conventional clay pot which has substantial permeability to moisture, the water taken into the soil of the container in substantial amount also may travel from the capillary openings 25 in the capillary sheet through the permeable material of which the container is composed. One of the advantages of the embodiment of this invention is that any number of standard size clay or plastic flower pots, of various sizes up to the capacity of the support area may be used and when so used may be placed at any convenient location on the upper surface of the capillary sheet.

Figure 4:
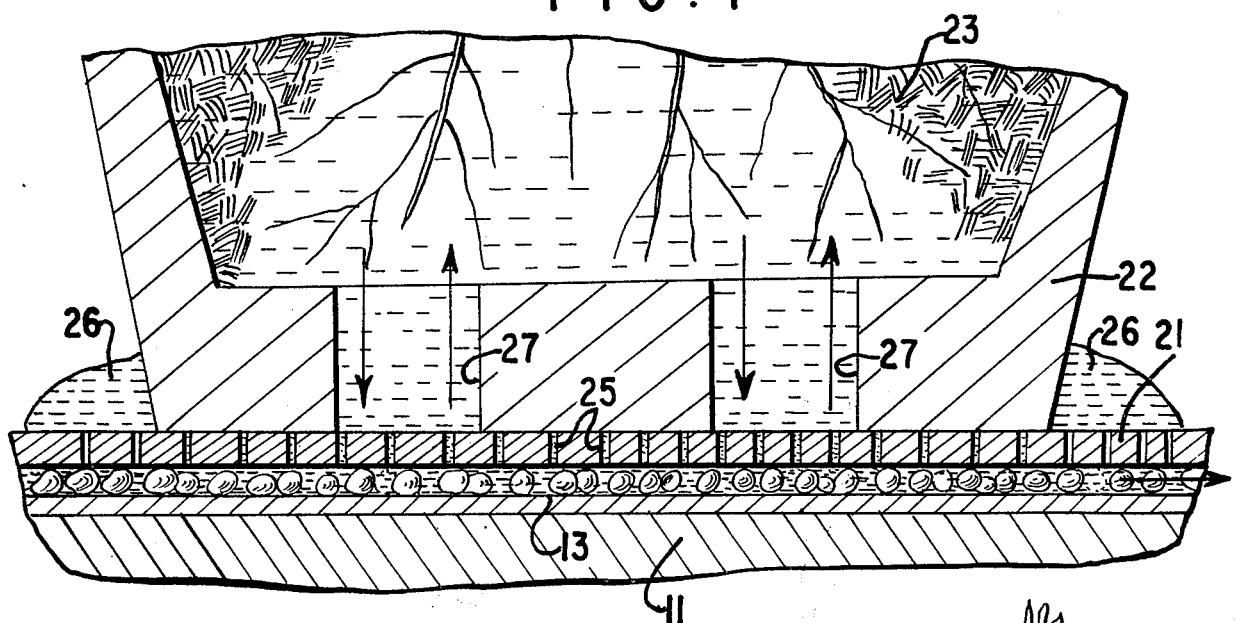
FIG. 4 is an enlarged view of the soil container shown in FIG. 2 which illustrates the migrating paths of the water on the silica sand catalyst sheet and capillary sheet.

The capillary movements of the water as hereinabove described also have been schematically shown in FIG. 4. These movements are indicated as involving the capillary flow of water from the interface between the silica sand catalyst sheet 13 and the capillary sheet 21 through the capillary openings 25 in the capillary sheet and thence into the soil in the container 22 with a concomitant migration of excretions downwardly through the capillary openings 25 to the interface between the silica sand catalyst sheet and the capillary sheet 21 where the excretions are carried off for drainage in a direction indicated by the horizontal arrow with excess water that is supplied by the water supply means to the interface between the two sheets.

Regardless of theoretical considerations, I have found as the result of prolonged experimentations in the culture of plants that the apparatus and method hereinabove described are attended with outstanding results in the growth of strong healthy plants. The improvements are attributed to the controlled supply of water for sustaining healthy plant growth under conditions where the water supply is fresh while at the same time removing the products which are excreted by the growing plants. Moreover, the growth of harmful algae or the occurrence of any other anaerobic conditions is virutally eliminated. It also is indicated that the nutrients taken up by the plant are supplied in a form believed to be due to ionization catalyzed by the silica sand catalyst sheet which is favorable to plant growth.

Figure 5:
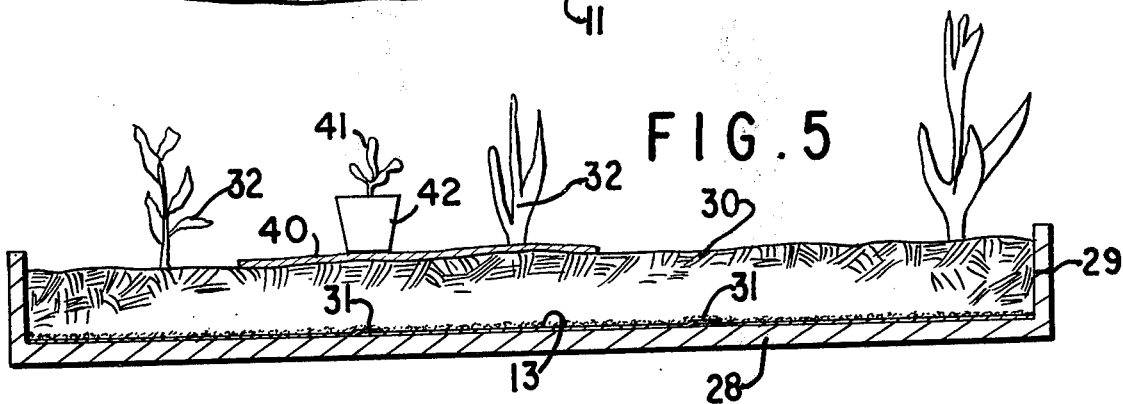
FIG. 5 illustrates the practice of this invention wherein the silica sand catalyst sheet underlies a body of soil in a hothouse bench.

In FIG. 5 a different modification of the invention is disclosed wherein the silica sand catalyst sheet 13 is employed in the bottom of a bench of a type commonly used in hothouses which has upstanding side walls 29 for containing a body of soil 30 and which may be about 4 ft. or 6 ft. wide. The silica sand catalyst sheet 13 may be supplied with such overlaps 31 as may be desired to completely cover the bottom of the bench with the sand coating facing upwardly so as to directly underlie the bottom of the soil 30. It has been found that when plants 32 are grown in the soil overlying the silica sand catalyst sheet 13 the plant growth is especially vigorous and substantially greater than when the silica sand catalyst sheet 13 is not employed. It is believed that this is due to the fact that the silica sand catalyst sheet provides improved distribution of moisture in the soil and in so doing exerts what is believed to be a catalytic effect on the ionizable salts and other nutrients for the plants.

It is to be understood that the pallet shown in FIG. 1, the pallets shown in FIG. 3 and the bench shown in FIG. 5 may be provided with any suitable framework for a supporting structure.

Figure 6:
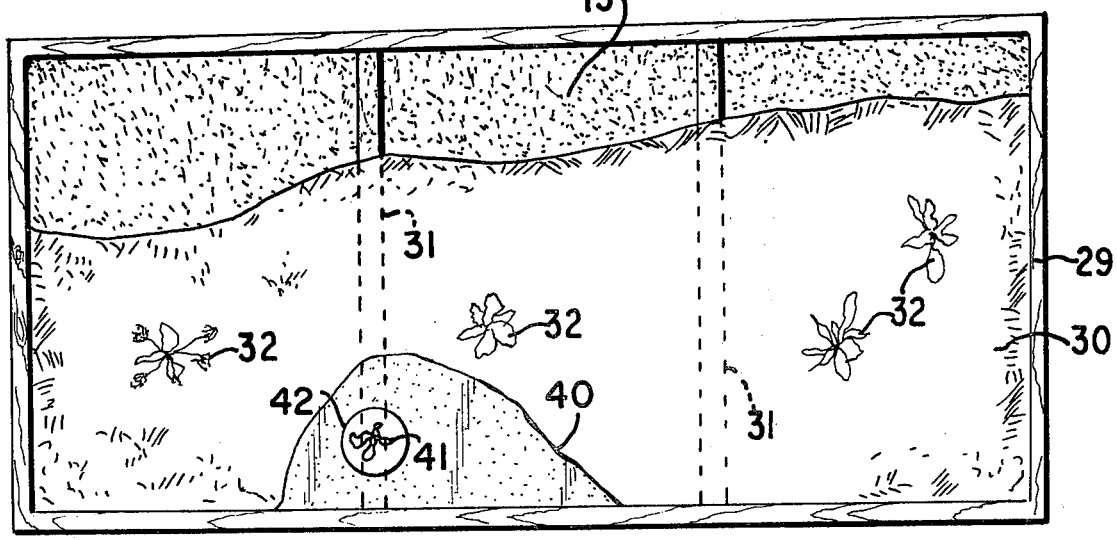
FIG. 6 is a plan view of the bench shown in FIG. 5 which illustrates the distribution of the silica sand catalyst sheet.

While preferred practice of this invention has been described in connection with the accompanying drawings, it is to be understood that this has been done for purposes of illustration and certain of the features and advantages of this invention may be availed of in other ways. Thus the capillary sheet 40 may be employed to cover the upper surface of the soil 30 in the bench shown in FIGS. 5 and 6, thereby providing an effective protective mulch for a plant 41 in a container 42 resting on top of the capillary sheet, whether the silica sand catalyst sheet and its attendant advantages are or are not availed of, and when the capillary sheet is used in this way water-receptive material other than soil and suitable for the transmission of water received thereby for transmission to the roots of a living plant may underlie the capillary sheet and be supplied with water, said water-receptive material preferably comprising an underlying silica sand catalyst sheet of the kind hereinabove described.

I claim:

1. A soil irrigating system for supplying water to a plant rooted in said soil which comprises a container for said soil having drain openings in the bottom, a bed of water-receptive material and interposed between said container bottom and said water-receptive material with its opposite surfaces respectively in contact with each, a plastic capillary sheet that is substantially impervious to moisture except for a multiplicity of substantially evenly spaced capillary openings adapted for capillary travel of water from said water-receptive material through said openings and thence through said drain openings in the bottom of said container into said soil, said capillary openings being essentially from about 0.045 to about 0.145 inch in diameter.

2. A soil irrigating system according to claim 1 wherein said plastic capillary sheet is substantially opaque.

3. A soil irrigation system according to claim 1 which comprises water supply means for supplying water to said water-receptive material.

4. A soil irrigating system according to claim 3 which also comprises a drain for draining away water supplied by said water supply means in excess of that which passes through said capillary openings in said capillary sheet.

5. A soil irrigation system according to claim 1 wherein said water-receptive material comprises a silica sand sheet that comprises a plastic sheet having adherent thereon a substantially continuous coating approximately one grain in thickness of silica sand particles essentially in the range from about 0.002 mm to about 0.25 mm that are interspersed with a network of capillary spaces conducive to lateral spreading of water therealong, said silica sand sheet being disposed with the surface thereof presenting said coating facing said capillary sheet.

6. A soil irrigation system according to claim 5 which comprises a body of soil that separates said plastic capillary sheet from said silica sand sheet.

7. A soil irrigating system according to claim 5 wherein said silica sand sheet directly underlies said capillary sheet in contact therewith.

8. A soil irrigation system which comprises a substantially horizontal support, a silica sand sheet which comprises a plastic sheet having adherent to a surface thereof a substantially continuous coating approximately one grain in thickness of silica sand the particles of which range essentially from about 0.002 mm to about 0.25 mm that are interspersed with a network of capillary spaces conducive to lateral spreading of water and which overlies said support with the silica sand coating disposed upwardly, means for supply water to said sheet to be spread laterally therealong from a locus of application of said water, and a body of soil disposed thereon and arranged for reception of water from said coating of said silica sand sheet.

9. A soil irrigating system which comprises a substantially horizontal support, a silica sand sheet overlying said support which comprises a plastic sheet having adherent on a surface thereof a substantially continuous coating approximately one grain in thickness of silica sand particles essentially in the size range from about 0.002 mm to about 0.25 mm that are interspersed with a network of capillary spaces conducive to lateral spreading of water therealong, said silica sand sheet being disposed with said coating facing upwardly, a substantially opaque plastic sheet that is substantially impervious to moisture except for a multiplicity of substantially evenly spaced capillary openings therethrough about 0.045 to about 0.145 inch in diameter adapted for capillary travel of water therethrough and that directly overlies the silica sand coating on the silica sand sheet and means for supplying water to the interface between said silica sand sheet and said capillary sheet.

10. A soil irrigating system according to claim 9 wherein said means for supplying water comprises a reservoir means for maintaining the level of water in said reservoir substantially constant, and tube means adapted and arranged to direct water therethrough from said reservoir to the interface between said silica sand sheet and said plastic capillary sheet.

11. A soil irrigating system according to claim 10 wherein said tube means comprises a plurality of tubes adapted to supply water to said interface at a plurality of spaced locations.

12. A soil irrigating system according to claim 9 wherein said support comprises a plurality of adjoining pallets which may be individually removed from underlying support means without removing therefrom said silica sand sheet or said capillary sheet from said pallet and together with any plant containers resting on the capillary sheet.

13. A soil irrigating system according to claim 12 wherein each pallet is bordered by a strip of impervious material about ¼ inch in height of which one end strip can be removed in part or entirely for regulating surplus drain-off off the pallet.

14. A soil irrigating system according to claim 12 wherein each pallet is bordered by a strip of material about ¼ inch in height, a portion of which along an end margin of the pallet is pivoted to provide a swing gate which is adjustable to control the damming effect of said strip.

15. A soil irrigating system according to claim 12 wherein said silica sand sheet and said capillary sheet on one pallet respectively overlap with corresponding sheets on an adjoining pallet.

16. In a method of irrigating soil within a plant container having a drain opening in the bottom to supply water to a growing plant rooted in said soil wherein water migrates through said drain opening from an underlying body of water-containing water-receptive material, the improvement which comprises effecting said migration through a substantially opaque capillary sheet that is substantially impervious to moisture except for spaced capillary openings therethrough and that overlies and is in contact with the upper surface of said body of water-receptive material and that underlies and is in contact with the drain opening in the bottom of said container; said capillary openings being essentially from about 0.045 to about 0.145 inch in diameter.

17. A method according to claim 16 wherein said water-receptive material comprises a silica sand sheet that comprises a plastic sheet having adherent on a surface thereof a substantially continuous coating approximately one grain in thickness of silica sand particles essentially in the range from about 0.002 to about 0.25 mm interspersed with a network of capillary spaces conducive to lateral spread of water therealong and directing a supply of water for localized contact with said silica sand sheet with lateral spreading therealong for maintaining the moisture content of said water-receptive material.

18. A method according to claim 17 wherein said capillary sheet directly overlies the silica sand surface of the silica sand sheet, and water is supplied to the interface between said capillary sheet and said silica sand sheet with attendant lateral spreading along said silica sand sheet and with concomitant travel of at least some of the supplied water through the capillary openings in the capillary sheet to irrigate soil in said container.

19. A method according to claim 16 wherein the supply of water is in excess of that transmitted to soil in the container and the excess is drained off and removed.

20. A method of irrigating soil having a plant rooted therein which comprises supplying water to a silica sand sheet underlying said soil and in contact therewith, said silica sand sheet comprising a plastic sheet having adherent thereon a substantially continuous coating approximately one grain in thickness of silica sand particles essentially in the range from about 0.002 to 0.25 mm that are interspersed with a network of capillary spaces conducive to lateral spread of water thereby effecting distribution of water along said silica sand sheet with concomitant transmission of water therefrom into said soil for irrigating said soil.

21. In a planter comprising a container having a body of soil therein suitable for the growth of a plant rooted in said body of soil, the improvement which comprises embedded in said soil a silica sand sheet comprising a plastic sheet having adherent on a surface thereof a substantially continuous coating approximately one grain in thickness of silica sand particles essentially in the size range from about 0.002 mm to about 0.25 mm that are interspersed with a network of capillary spaces, said silica sand sheet being embedded in said soil with said surface in position to face the roots of a plant rooted in said soil.

22. A method of plant culture which comprises rooting a plant having roots in a body of soil and embedding in said body of soil a silica sand sheet comprising a plastic sheet having adherent to a surface thereof a substantially continuous coating approximately one grain in thickness of silica sand particles essentially in the size range from about 0.002 mm to about 0.25 mm that are interspersed with a network of capillary spaces for stimulating plant growth.

* * * * *